United States Patent Office 3,230,838
Patented Jan. 25, 1966

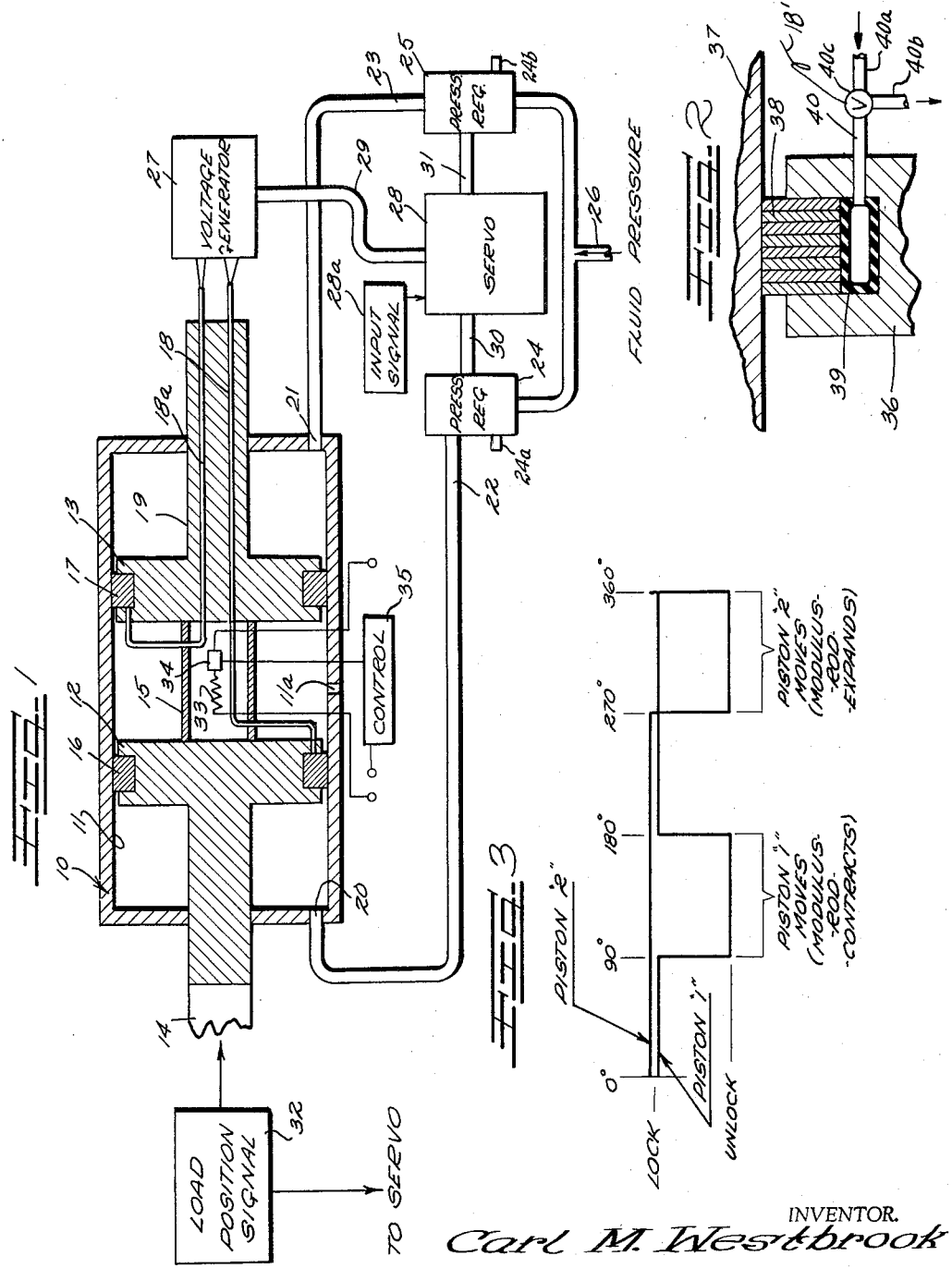

3,230,838
DUAL LOCK POSITIONING CYLINDER
Carl M. Westbrook, Beloit, Wis., assignor to Beloit Corporation, Beloit, Wis., a corporation of Wisconsin
Filed Nov. 14, 1963, Ser. No. 323,824
14 Claims. (Cl. 91—42)

The present invention relates to an improved positive locating load positioning device and more particularly to a pneumatic cylinder which positions the load in accordance with an input signal with extreme accuracy and without hysteresis and with zero overtravel.

The invention contemplates providing a closed cylindrical chamber with an outer wall having first and second pressure inlets at the ends with means for selectively delivering fluid pressure to the cylinder ends and with pistons slidably mounted in the cylinder and for connection to a load, a modulus rod rigidly connected between the pistons and means such as piezo electric ceramic rings for cyclically locking the pistons to the cylinder walls at the same frequency and out of phase so that each piston is unlocked for a period while the other is locked and so that the connector rod will store energy while one piston is unlocked and will release energy to move the other piston while it is unlocked.

In systems and mechanisms for moving loads in response to an input signal breakaway friction is normally encountered which must be overcome before the force moving apparatus begins to move. This problem is encountered in such devices as a nut and screw power system or in any system where the breakaway friction is higher than the sliding friction. In these devices and in conventional pneumatic power systems the movement delivered tends to overshoot. Also a soft air cylinder will shift with external load changes. Further, movement is usually obtained with changing velocities and the velocity normally diminishes as the positioning device approaches the desired zero position. In devices requiring infinite accuracy lags in initial movement and overtravel, with changes in velocity are highly undesirable, for example in the use of power movers for highly accurate controls in missile systems or for power operators in instruments used in astronomy wherein heavy parts must be moved with infinite precision through very small distances.

It is accordingly an object of the present invention to provide a load positioning mechanism capable of fast positioning with a substantially uniform velocity or with controlled diminishing velocity for obtaining fast positioning with zero overtravel.

A further object of the invention is to provide a positioning mechanism which when locked in position will act as a solid unit and will not shift with external load changes.

A further object of the invention is to provide a power load positioning device capable of adaptation to moving loads of substantially any size with infinite accuracy, and wherein the speed of travel or movement can be varied to obtain a fixed speed of travel or to change the speed of travel during operation.

A still further object of the invention is to provide a positioning device which will provide desired movement in accordance with a signal and will position a load with infinite resolution and with substantially zero hysteresis.

Other objects, advantages and features will become more apparent with the teaching of the principles of the invention in connection with the disclosure of the preferred embodiments thereof in the specification, claims and drawings, in which:

FIGURE 1 is a schematic sectional view showing a load positioning device constructed and operating in accordance with the principles of the present invention;

FIGURE 2 is a fragmentary detailed view showing an alternate form of a portion of the mechanism; and FIGURE 3 is a diagrammatic view showing the cycle relationship of operation of certain parts.

On the drawings:

FIGURE 1 shows a load positioning device having a closed cylinder 10 with a cylindrical wall 11 and first and second pistons 12 and 13 movable therein. The pistons are movable within the cylinder 10 for positioning a load and a piston rod 14 is provided for connecting to the load.

A modulus rod 15 is rigidly connected to the cylinders and is relatively resilient so that it will store energy when one piston moves and the other is locked, and will transmit that energy to the other piston when said one piston is locked and the other piston is unlocked. The modulus rod 15 is shown as a hollow metal tube but other structural arrangements may be employed such as a spring or cantilever supported connection between the pistons 12 and 13.

Each of the pistons are provided with means for locking the pistons to the wall 11 of the cylinder, shown in the form of annular rings 16 and 17. These rings may be mechanically, hydraulically or thermally actuated for alternately releasing and gripping the wall 11, but preferably are in the form of piezo electric ceramic rings which positively lock to the walls when electrically energized and unlock or release from the walls when deenergized.

Separate sets of electrical leads 18 and 18a lead to the locking rings 16 and 17 for cyclically unlocking and locking the piston to the cylinder wall 11 as will be described. To provide a conduit for the leads 18 and 18a a passaged piston rod extension 19 is provided on the piston 13 extending through the end wall of the cylinder 10.

Pressure inlets 20 and 21 lead into the end walls of the cylinder for selectively directing fluid such as air under pressure into the cylinder ends. Air pressure is supplied through lines 22 and 23 from pressure regulated control valves 24 and 25 which are supplied from a main air pressure line 26.

For supplying electricity to the locking rings 16 and 17 a voltage generator 27 is provided. The voltage generator and the pressure regulator valves 24 and 25 are operated by a servo 28 which receives a suitable operating signal indicated at 28a. The follow-up position signal is suitably supplied such as by a mechanism shown at 32 or the device may be manually controlled. As will be apparent from the foregoing, when a desired movement of the load for a given length of travel is required, the movement is initiated by the signals provided at 28a. The servo pressurizes one end of the cylinder 10 venting the other end, and under control of the servo 28 the voltage generator 27 applies the cyclic voltage to the locking rings 16 and 17 to move the load. When the load has moved the required amount, a signal is sent to the servo, the cycling of the voltage terminates and one or both rings 16 and 17 are locked to the wall of the cylinders, and both ends of the cylinder are vented at atmosphere. Thus, the follow-up position signal controls the servo to stop movement of the piston rod 14 when the desired travel has been obtained.

In operation, when the pistons are to be moved to the right, for example, to move the load to the right, pressure is admitted through the inlet 20 and the other end of the cylinder is relieved through the inlet 21. The center of the cylinder is preferably maintained at atmospheric pressure through a vent opening 11a.

When the left end of the cylinder 10 is pressurized through the inlet 20, a force will be applied to the piston 12. In the operating cycle the piston 12 is unlocked from the wall 11 of the cylinder and the piston 13 will be locked in position. A force will be applied against the modulus rod 15 which will shorten and be under stress to store energy. The piston 12 is then locked to the cylinder wall 11 and the piston 13 is released. Immediately upon the release of the piston 13 the modulus rod 15 will extend and release its energy and transmit movement to the piston 13. The cycle is again repeated with the piston 13 being locked and the piston 12 being unlocked, and the piston 13 must then again be unlocked while the piston 12 is locked.

Movement in the opposite direction is accomplished in the same manner with the inlet opening 20 being vented and the inlet 21 being pressurized. When piston 12 is locked the cylinder wall and piston 13 is released, the modulus rod 15 will shorten, and when piston 13 is locked to the cylinder wall and piston 12 is released the modulus rod will extend to move the piston 12.

Thus the cylinder wall 11 defines a support for the pistons for their movement along a path, and pistons 12 and 13 provide movable elements which are connected by a resilient connector in the form of the modulus rod 15. The pistons are cyclically locked and unlocked from the support means or cylinder wall 11, at the same frequency, but in out of phase relationship so that one element is unlocked during a time the other element is locked and energy is stored in the connector 15 when the first element is unlocked and the second element locked, and released to the second element when it is unlocked and the first element locked.

The frequency of locking and unlocking is controlled by the servo operating the voltage generator. The servo responding to the input signal also controls the pressures to the ends of the cylinder, and when the predetermined movement has been achieved, the pressures may be dropped to zero and either one or both pistons positively locked to the cylinder wall.

The amount of movement of the piston to which pressure is applied, for each cycle, will be dependent upon the resiliency, or the modulus or K factor of the modulus rod 15. Accordingly the over-all speed of movement for any given frequency can be controlled by the K factor of the modulus rod 15, and in order to maintain this constant for constant operating conditions a temperature control member 33 with a control device 34 may be provided in connection with the modulus rod electrically operated through suitable leads.

The temperature may be regulated through an external regulator 35 for changing the controlled temperature of the modulus rod 15 to increase or decrease the K factor thereof and to accordingly variably controlled the speed of movement of the piston assembly.

Another means of controlling the speed of movement of the piston assembly is by changing the pressure acting on the piston. This can be done through operation of the servo by setting of the pressure regulator valves 24 and 25.

It will become apparent from the foregoing and from the drawing that the connections between the voltage generator 27, the servo 28 and the pressure regulator valves 24 and 25 are schematic. The connections 29, 30 and 31 may be mechanical, electrical or pneumatic or hydraulic connections, or a combination of the foregoing, as will be fully apparent to those versed in the art. The servo 28 through the connections 30 and 31 operates the pressure regulator valves to selectively admit a controlled pressure to either end of the cylinder 10, or to selectively vent either or both ends of the cylinder with air escaping through vents in each of the valves, at 24a and 24b. The connection 29 is of course arranged so that an electrical voltage from the voltage generator 27 is selectively applied through either of the connections 18 or 18a. When the arrangement of FIGURE 2 is used, as will be described later herein, a valve 40c will be operated such as through an electrical connection 18' connected similarly to the electrical leads 18 or 18a in FIGURE 1 and also controlled from the servo 28.

A still further way of controlling the speed of operation of the piston assembly is by controlling the frequency of the locking cycles. As the frequency is increased, the speed of movement will be proportionately increased.

As will be apparent from the foregoing, the servo 28 controls the valves 24 and 25 so that one end of the cylinder 10 is pressurized while the other is vented to atmosphere. The input signal will determine which end is pressurized in accordance with the direction in which the rod 14 is to be moved. The servo also coacts with the voltage generator to impress the voltage at the cyclic frequency on the rings 16 and 17 and the servo simultaneously controls the valves and the voltage generator and it receives an input signal requiring movement of the rod 14. When the rod 14 has moved a predetermined distance, as required by the original input signal, the load position signal 32 feeds a command back to the servo stopping its operation so that the voltage generator ceases to impress the cyclic voltage on the rings and locks them in place, and at the same time both ends of the cylinder 10 are vented to atmosphere.

In the cyclic locking and unlocking operation of the pistons, a preferred relationship is to operate the locking rings 16 and 17 180° out of phase so that one will always be locked while the other is unlocked. A preferred relationship is by using a 270° lock time and a 90° unlock time. This is illustrated in FIGURE 3 by the graphs designating the conditions of the locking rings of the two pistons for a complete cycle. At the beginning of the cycle the locking rings of the two pistons are indicated as being locked, and at the end of 90° the first piston (against which the fluid force is applied) is released, to shorten and store energy in the modulus rod. From a 180° to 270° both pistons are locked, and at 270° the second piston is unlocked while the first piston remains locked so that the second piston moves while the modulus rod transmits its energy and movement.

The locking rings 16 and 17 are preferably in the form of piezo electric crystals which are obtainable commercially and which expand in a direction in accordance with their design radially outwardly to lock against the wall of the cylinder 10 when the voltage for which they are designed is applied thereto. However other forms of locking may be employed such as embodying thermal expansion or contraction, or mechanical or hydraulic expansion and contraction.

FIGURE 2 illustrates a hydraulic locking arrangement wherein a piston 36 locks against a cylinder wall 37 through a radially movable surface or annular band 38 which is expanded and contracted by an annular inflatable bellows or hose 39 supplied with fluid under pressure through a line 40. The line 40 may be selectively pressurized from a supply line 40a or vented through a line 40b by operation of a valve 40c. In an hydraulic mechanism such as shown in FIGURE 2 the cycle frequency of operation has an upper limit of 300 cycles per second. For mechanical expansion of the band 38 through mechanical operations a limit of range of operations will lie within 30 cycles per second for the lower limit to 1800 cycles per second for the upper limit.

For electrically locking rings such as the piezo electric crystals the upper limit is the speed of the shock wave through the modulus rod.

Thus it will be seen that the unit readily and controllably moves in either direction and the movement is positive and can be retained at uniform velocities by applying a uniform and controlled fluid pressure to either end of the cylinder 10. The velocity of operation can be slowed or speeded during operation at will by regulation of one of the factors of the modulus of the modulus rod 15, the frequency of cycling, or the force applied through fluid pressure.

The apparatus and method meet the objectives and advantages above set forth and provide a reliable mechanism which is readily adaptable to use for movement of loads of substantially any size depending upon the capacity design of the device. The device is capable of operation without adjustment or attention and avoids disadvantages of non-positive locking, overshoot, hysteresis, yieldability, and non-positive resolution encountered in devices heretofore available.

The drawings and specification present a detailed disclosure of the preferred embodiments of the invention, and it is to be understood that the invention is not limited to the specific forms disclosed, but covers all modifications, changes and alternative constructions and methods falling within the scope of the principles taught by the invention.

I claim as my invention:

1. A positive locating load positioning device comprising,
   a closed cylindrical chamber with an outer wall having first and second fluid pressure inlets at the ends,
   means for selectively delivering fluid pressure to said first or said second cylinder ends,
   first and second pistons slidably mounted in said cylinder,
   a resilient force transmitting connector rigidly secured between said pistons,
   and means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked.

2. A positive locating load positioning device comprising,
   a closed cylindrical chamber with an outer wall having first and second fluid pressure inlets at the ends,
   means for selectively delivering fluid pressure to said first or said second cylinder ends,
   first and second pistons slidably mounted in said cylinder,
   a resilient force transmitting connector rigidly secured between said pistons,
   piezo electric ceramic rings carried on the pistons for locking and unlocking the pistons to the cylinder wall,
   and means for delivering an alternating electrical pulse to said rings for cyclically locking and unlocking said pistons to the cylinder wall at the same frequency and out of phase so that each piston is unlocked for a period while the other is locked and fluid pressure at the first end of the cylinder will store energy in said connector during the unlocking period of the first piston and release energy to move said second piston while it is unlocked.

3. A positive locating load positioning device comprising,
   a closed cylindrical chamber with an outer wall having first and second fluid pressure inlets at the ends,
   means for selectively delivering fluid pressure to said first or said second cylinder ends,
   first and second pistons slidably mounted in said cylinder,
   a resilient force transmitting connector rigidly secured between said pistons,
   means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked,
   and a servo connected to said fluid pressure means and said cyclic locking and unlocking means and restoring pressures to equal at opposite ends of the cylinder and terminating operation of said cyclic locking and unlocking means with at least one piston locked when a desired movement is obtained.

4. A positive locating load positioning device comprising,
   a closed cylindrical chamber with an outer wall having first and second fluid pressure inlets at the ends,
   means for selectively delivering fluid pressure to said first or said second cylinder ends,
   first and second pistons slidably mounted in said cylinder,
   a resilient force transmitting connector rigidly secured between said pistons,
   means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked,
   and a temperature control means connected to said connector for controlling the modulus thereof.

5. A positive locating load positioning device comprising,
   a closed cylindrical chamber with an outer wall having first and second fluid pressure inlets at the ends,
   means for selectively delivering fluid pressure to said first or said second cylinder ends,
   first and second pistons slidably mounted in said cylinder,
   a resilient force transmitting connector rigidly secured between said pistons,
   and means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked,
     said cyclic locking and unlocking means locking each element for substantially 270° and unlocking the element for substantially 90° of each cycle.

6. A positive locating load positioning device comprising,
   a closed cylindrical chamber with an outer wall having first and second fluid pressure inlets at the ends,
   means for selectively delivering fluid pressure to said first or said second cylinder ends,
   first and second pistons slidably mounted in said cylinder,
   a resilient force transmitting connector rigidly secured between said pistons,
   means for cyclically locking and unlocking each of said pistons to said cylinder wall at the same frequency and in out of phase relationship so that each piston is unlocked for a period while the other is locked and fluid pressure in said connector during the unlocked period of one of said pistons and release energy and move the other piston while it is unlocked,
     said locking and unlocking means including a radially movable annular surface on the piston movable outwardly to radially wedge against the cylinder wall and inwardly to unlock the piston,
   and means for moving said surface outwardly and inwardly.

7. A positive locating load positioning device comprising, a closed cylindrical chamber with an outer wall having first and second fluid pressure inlets at the ends, means for selectively delivering fluid pressure to said first or said second cylinder ends, first and second pistons slidably mounted in said cylinder, a resilient force transmitting connector rigidly secured between said pistons, means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked, said locking and unlocking means including a radially movable annular surface on the piston movable outwardly to radially wedge against the cylinder wall and inwardly to unlock the piston, and a pressure inflatable and deflatable chamber between said annular surface and the piston with means for directing a fluid under pressure to said chamber or relieving the pressure in said chamber.

8. A positive locating load positioning device comprising, a closed cylindrical chamber with an outer wall having first and second fluid pressure inlets at the ends, means for selectively delivering fluid pressure to said first or said second cylinder ends, first and second pistons slidably mounted in said cylinder, a resilient force transmitting connector rigidly secured between said pistons, means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked, said locking and unlocking means including a radially movable annular surface on the piston movable outwardly to radialy wedge against the cylinder wall and inwardly to unlock the piston.

and means for mechanically moving said surface inwardly and outwardly at a range of between 50 cycles per second and 1800 cycles per second.

9. A positive locating load positioning device comprising, a closed cylindrical chamber with an outer wall having first and second fluid pressure inlets at the ends, means for selectively delivering fluid pressure to said first or said second cylinder ends, first and second pistons slidably mounted in said cylinder, a resilient force transmitting connector rigidly secured between said pistons, and means for cyclically locking and unlocking each of said pistons to said cylinder wall at the same frequency and in out of phase relationship so that each piston is unlocked for a period while the other is locked and fluid pressure in one end of the cylinder will store energy in said connector during the unlocked period of one of said pistons and release energy and move the other piston while it is unlocked, said cyclic locking and unlocking means operating at a range of speed below the speed of the shock wave through the connector.

10. A positive locating load positioning device comprising, a closed cylindrical chamber with an outer wall having first and second fluid pressure inlets at the ends, means for selectively delivering fluid pressure to said first or said second cylinder ends, first and second pistons slidably mounted in said cylinder, a modulus rod rigidly secured between said pistons, means for controlling the temperature of said modulus rod for controlling its K factor, piezo electric ceramic rings carried on the pistons for locking the pistons to the cylinder wall, a voltage generator connected to said rings, a control servo connected to said generator and cyclically controlling electrical energy to said rings cyclically energizing and de-energizing said rings to lock and unlock them from the wall and being out of phase so that one ring is unlocked for a period while the other is locked, control valves for controlling said pressure delivery means and being connected to said servo, and means for transmitting an operating signal to said servo and a position signal to said servo so that pressure will be delivered to one end of the cylinder for obtaining a predetermined movement and when said movement is completed pressure will be terminated and electrical energy will be controlled to said ceramic rings to lock the pistons in position.

11. A positive locating load positioning device comprising, first and second elements movable along a longitudinal path, a non-yielding support means engaging said elements for locking said elements against movement in said path, a resilient connector rigidly joined to said elements, means applying a longitudinal force to said first element, a load connection for said second element movable along said longitudinal path, and means for cyclically positively locking and unlocking said elements to said support means at the same frequency and out of phase so that one element is unlocked during a time and the other element is locked and energy is stored in said connector from the first element during the time it is unlocked and the second element is moved along said path during the time it is unlocked.

12. A positive locating load positioning device comprising, first and second elements movable along a longitudinal path, a non-yielding support means engaging said elements for locking said elements against movement in said path, a resilient connector rigidly joined to said elements, means applying a longitudinal force to said first element, a load connection for said second element movable along said longitudinal path, means for cyclically positively locking and unlocking said elements to said support means at the same frequency and out of phase so that one element is unlocked during a time and the other element is locked and energy is stored in said connector from the first element during the time it is unlocked and the second element is moved along said path during the time it is unlocked, and means for controlling the deflection modulus of said connector for controlling the speed of movement of the second element.

13. A positive locating load positioning device comprising, first and second elements movable along a longitudinal path, a non-yielding support means engaging said elements for locking said elements against movement in said path, a resilient connector rigidly joined to said elements, means applying a longitudinal force to said first element,
a load connection for said second element movable along said longitudinal path,
means for cyclically positively locking and unlocking said elements to said support means at the same frequency and out of phase so that one element is unlocked during a time and the other element is locked and energy is stored in said connector from the first element during the time it is unlocked and the second element is moved along said path during the time it is unlocked, and means for controlling the cyclic frequency of said locking and unlocking means for controlling the speed of movement of the second element.

14. A positive locating load positioning device comprising,
first and second elements movable along a longitudinal path,
a non-yielding support means engaging said elements for locking said elements against movement in said path, a resilient connector rigidly joined to said elements, means applying a longitudinal force to said first element, a load connection for said second element movable along said longitudinal path,
means for cyclically positively locking and unlocking said elements to said support means at the same frequency and out of phase so that one element is unlocked during a time and the other element is locked and energy is stored in said connector from the first element during the time it is unlocked and the second element is moved along said path during the time it is unlocked,
and means for controlling the force applied by said force applying means for controlling the speed of movement of said second element.

References Cited by the Examiner

UNITED STATES PATENTS

| | | | |
|---|---|---|---|
| 1,264,422 | 4/1918 | Moard | 91—42 |
| 1,650,013 | 11/1927 | Gartin | 92—28 |
| 2,323,731 | 7/1943 | Shetzline | 92—28 |
| 2,524,271 | 10/1950 | Rappl | 92—28 |
| 2,969,772 | 1/1961 | Cahill | 91—44 |
| 2,988,058 | 6/1961 | Warnecke | 92—28 |

SAMUEL LEVINE, *Primary Examiner.*

FRED E. ENGELTHALER, *Examiner.*